US012802281B2

(12) United States Patent
Lasserre

(10) Patent No.: US 12,802,281 B2
(45) Date of Patent: Nov. 17, 2026

(54) CLOUD GEOMETRY DATA SENSED BY AT LEAST ONE SENSOR

(71) Applicant: BEIJING XIAOMI MOBILE SOFTWARE CO., LTD., Beijing (CN)

(72) Inventor: Sebastien Lasserre, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 296 days.

(21) Appl. No.: 18/691,279

(22) PCT Filed: Jun. 20, 2022

(86) PCT No.: PCT/CN2022/099973

§ 371 (c)(1),
(2) Date: Mar. 12, 2024

(87) PCT Pub. No.: WO2023/040393

PCT Pub. Date: Mar. 23, 2023

(65) Prior Publication Data

US 2024/0404117 A1 Dec. 5, 2024

(30) Foreign Application Priority Data

Sep. 17, 2021 (EP) .................................... 21306291

(51) Int. Cl.
*H04N 19/91* (2014.01)
*G06T 9/00* (2006.01)

(52) U.S. Cl.
CPC .................................. *G06T 9/001* (2013.01)

(58) Field of Classification Search
USPC ........................................................ 382/232
See application file for complete search history.

(56) References Cited

U.S. PATENT DOCUMENTS

2019/0075320 A1* 3/2019 Mammou ............ H04N 19/597
2019/0394496 A1 12/2019 Tourapis et al.
(Continued)

FOREIGN PATENT DOCUMENTS

CN 112789804 A 5/2021
EP 3595181 A1 1/2020
EP 3751520 A1 12/2020

OTHER PUBLICATIONS

European Patent Application No. 21306291.2 Search and Opinion dated Mar. 14, 2022, 12 pages.
(Continued)

*Primary Examiner* — Chineyere Wills-Burns
*Assistant Examiner* — Bezawit Nolawi Shimeles
(74) *Attorney, Agent, or Firm* — Cozen O'Connor

(57) ABSTRACT

Methods and apparatuses herein encode/decode point cloud geometry data represented by geometrical elements occupying some discrete positions of a set of discrete positions of a multi-dimensional space. An index range reduction function is used to map each index of a first set of neighborhood occupancy configuration indices to an index of a second set of neighborhood occupancy configuration indices, the range of the second set of neighborhood occupancy configuration indices being lower than the range of the first set of neighborhood occupancy configuration indices. At least one binary data ($f_j$) representative of an occupancy of a current geometrical element is entropy encoded/decoded based on a mapped index (I2).

16 Claims, 12 Drawing Sheets

(56) References Cited

U.S. PATENT DOCUMENTS

| | | | | |
|---|---|---|---|---|
| 2020/0013215 | A1* | 1/2020 | Vosoughi | G06T 17/005 |
| 2021/0112276 | A1* | 4/2021 | Yea | H04N 19/105 |
| 2021/0258610 | A1 | 8/2021 | Iguchi et al. | |
| 2021/0383575 | A1* | 12/2021 | Zhang | G06T 9/001 |
| 2022/0345728 | A1* | 10/2022 | Poirier | H04N 19/61 |
| 2022/0383553 | A1* | 12/2022 | Park | G06T 9/001 |
| 2025/0322549 | A1* | 10/2025 | Oh | H04N 19/60 |

OTHER PUBLICATIONS

Lasserre, S. et al. (Blackberry) "[PCC] Neighbour-dependent entropy coding of occupancy patterns in TMC3" ISO/IEC JTC1/SC29/WG11 MPEG2018/m42238, Jan. 2018, 11 pages.

WG 7, MPEG 3D Graphics "V-PCC Codec Description" ISO/IEC JTC 1/SC 29/WG7 MPEG Meeting, No. 20352, Jun. 2021, 77 pages.

Indian Patent Application No. 202447027988, Office Action dated Jul. 30, 2025, 8 pages.

* cited by examiner

CLOUD GEOMETRY DATA SENSED BY AT LEAST ONE SENSOR

CROSS-REFERENCE TO RELATED APPLICATIONS

This application is a U.S. national phase application of International Application No. PCT/CN2022/099973, filed Jun. 20, 2022, which is based upon and claims a priority to European Patent Application No. 21306291.2, filed on Sep. 17, 2021, the entire contents of which are incorporated herein by reference.

FIELD

The present application generally relates to point cloud compression and, in particular to methods and apparatus of encoding/decoding point cloud geometry data sensed by at least one sensor.

BACKGROUND

The present section is intended to introduce the reader to various aspects of art, which may be related to various aspects of at least one embodiments of the present application that is described and/or claimed below. This discussion is believed to be helpful in providing the reader with background information to facilitate a better understanding of the various aspects of the present application.

As a format for the representation of 3D data, point clouds have recently gained traction as they are versatile in their capability in representing all types of physical objects or scenes. Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations allow for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

Virtual Reality (VR), Augmented Reality (AR) and immersive worlds have recently become a hot topic and are foreseen by many as the future of 2D flat video. The basic idea is to immerse the viewer in a surrounding environment, in contrast to a standard TV that only allows the viewer to look at the virtual world in front of him/her. There are several gradations in the immersivity depending on the freedom of the viewer in the environment. A point cloud is a good format candidate for distributing VR/AR worlds.

The automotive industry, and more particularly foreseen autonomous cars, are also domains in which point clouds may be intensively used. Autonomous cars should be able to "probe" their environment to make good driving decisions based on the detected presence and nature of their immediate nearby objects and road configuration.

A point cloud is a set of points located in a three-dimensional (3D) space, optionally with additional values attached to each of the points. These additional values are usually called attributes. Attributes may be, for example, three-component colors, material properties like reflectance and/or two-component normal vectors to a surface associated with a point.

A point cloud is thus a combination of geometry data (locations of the points in a 3D space usually represented by 3D cartesian coordinates x, y and z) and attributes.

Point clouds may be sensed by various types of devices like an array of cameras, depth sensors, lasers (light detection and ranging, also known as Lidars), radars, or may be computer-generated (for example in movie post-production). Depending on the use cases, points clouds may have from thousands to up to billions of points for cartography applications. Raw representations of point clouds require a very high number of bits per point, with at least a dozen of bits per cartesian coordinate x, y or z, and optionally more bits for the attribute(s), for instance three times 10 bits for the colors.

It is important in many applications to be able to either distribute point clouds to an end-user or store them in a server by consuming only a reasonable amount of bitrate or storage space, while maintaining an acceptable (or preferably very good) quality of experience. Efficient compression of these point clouds is a key point in order to make the distribution chain of many immersive worlds practical.

Compression may be lossy (like in video compression) for the distribution to and visualization by an end-user, for example on AR/VR glasses or any other 3D-capable device. Other use cases do require lossless compression, like medical applications or autonomous driving, to avoid altering the results of a decision obtained from the subsequent analysis of the compressed and transmitted point cloud.

Until recently, point cloud compression (aka PCC) was not addressed by the mass market and no standardized point cloud codec was available. In 2017, the standardization working group ISO/JCT1/SC29/WG11, aka Moving Picture Experts Group or MPEG, has initiated work items on point cloud compression. This has led to two standards, namely

- MPEG-I part 5 (ISO/IEC 23090-5) or Video-based Point Cloud Compression (aka V-PCC)
- MPEG-I part 9 (ISO/IEC 23090-9) or Geometry-based Point Cloud Compression (aka G-PCC)

Point cloud geometry data may be represented by geometrical elements defined in a three-dimensional space.

For example, point cloud geometry data may be represented by a voxel representation as depicted on FIG. 1. A voxel representation splits a bounding box surrounding a point cloud into three-dimensional geometrical elements denoted voxels. The voxel representation may be scanned in a raster scan order.

On FIG. 1, the order shown follows a raster scan firstly in y, secondly in x and finally in z. Point cloud geometry data may be entirely represented in a voxel representation and each occupied voxel, i.e. voxels comprising each at least a point of the point cloud, may be accessed from the raster scan order in xyz (or yxz or any axis order) for example. A binary data $f_j$ is usually associated with each voxel j to indicate that at least one point of the point cloud is comprised in the voxel. This binary is commonly called occupancy data or occupancy flag. For example, a binary data $f_j$ equals to 0 indicates that a voxel j is unoccupied (does not comprise a point of the point cloud) and a binary data $f_j$ equals to 1 indicated that at least one point is comprised in the voxel j.

In G-PCC, an octree representation is used for representing point cloud geometry data. The geometrical elements are nodes of said octree, each node being associated with a cube (or more generally a "shoebox-shaped" cuboid) comprising at least one point of the point cloud. A root cube is associated with the root node of the octree. This root cube is split into eight equal child cubes associated with the eight child nodes of the root node. The child cubes are scanned in a predetermined scan order. Each child cube is marked occupied or unoccupied depending upon the presence or not of at least one point of the point cloud in the child cube. The split is applied recursively to child-cubes, grand-child-cubes, etc., until a predetermined maximum depth is reached. In G-PCC, the scanning is performed in a depth first order, i.e. all nodes of a given depth are processed before those of the next depth. The point cloud is coded as a set of points located in occupied leaf nodes having maximum depth, for instance at the centre of such nodes. Consequently, the set of points of the point cloud is entirely determined by the root cube, the predetermined scan order of child nodes, the maximum depth and an 8-bit occupancy pattern associated with each occupied internal node. The 8-bit occupancy pattern comprises 8 binary data $f_j$ each associated with a child node j, the binary data $f_j$ indicates the occupancy data of the associated child node j.

Encoding point cloud geometry data comprises coding the binary data $f_j$ by a context-adaptive entropy encoder. The binary data $f_j$ may be associated with a voxel of a voxel representation or a child node of an octree defined over a voxel representation.

Context-adaptive entropy encoding a binary data $f_j$ requires that a context associated with the binary data $f_j$ be selected. A context selection process should use relevant available (i.e. already coded) information and correlation to obtain this adequate context. The context is usually selected based on neighborhood occupancy configurations associated with the current node/cube(or cuboid)/voxel to be coded. A neighborhood occupancy configuration is a set of occupancy data associated with nodes/cubes(or cuboids)/voxels belonging to a causal neighborhood relative to a current node/cube (or cuboid)/voxel for which a binary data $f_j$ to be entropy encoded.

FIG. 1 shows schematically a neighboring causality of already coded nodes/cubes/voxels (white cubes) toward a current node/cube/voxel (hashed cube) to be coded. Already coded neighboring nodes/cubes/voxels are those whose raster scan order is lower than the order of the current node/cube/voxel.

FIG. 2 shows schematically an example of a neighborhood occupancy configuration, i.e. an example of a causal neighborhood of a current node/cube/voxel for which only occupied nodes are drawn. The number of possible neighborhood occupancy configurations is $2^N$ where N is the number of nodes/cubes/voxels involved in the causal neighborhood.

In an octree representation of the point cloud, if nodes are processed in a depth first order as in G-PCC, one may profit from the knowledge of the occupancy data of nodes at higher depth as depicted on FIG. 3.

Nodes at depth higher than the current node are used to obtain geometry information in regions (here for y higher than the y of the current node) not yet coded at current depth.

In G-PCC, a combination of neighboring nodes at current depth and current depth plus one is used to define a neighborhood. However, in order to limit the number of possible neighborhood occupancy configurations, the neighborhood has been limited to a subset of the set of nodes adjacent (defined as "sharing a face with") to the current node.

FIG. 4 shows schematically an example of a neighborhood occupancy configuration when neighboring nodes of depth higher than the current depth are also involved.

Point cloud geometry data may also be represented by a coarse representation defined in a two-dimensional coordinate space.

For example, in the working group ISO/IEC JTC 1/SC 29/WG 7 on MPEG 3D Graphics Coding, a new codec named L3C2 (Low-Latency Low-Complexity Codec) is being considered to improve, relative to the G-PCC codec, the coding efficiency of Lidar-sensed point clouds. The codec L3C2 provides an example of a two-dimensional representation of the points of a point cloud namely a coarse representation. A description of the code can be found in the output document of the Working Group in N00167, ISO/IEC JTC 1/SC 29/WG 7, MPEG 3D Graphics Coding, "Technologies under Consideration in G-PCC", Aug. 31, 2021.

Basically, for each sensed point $P_n$ of the point cloud, a sensor index $\lambda_n$ associated with a sensor that sensed the point $P_n$ and an azimuthal angle $\phi_n$ representing a sense angle of said sensor are obtained by converting 3D cartesian coordinates $(x_n, y_n, z_n)$ representing the 3D location of the sensed point $P_n$. Points of the point cloud are then ordered based on the azimuthal angles $\phi_n$ and the sensor indices $\lambda_n$, for example, according to a lexicographic order based first on the azimuthal angle and then on the sensor index. The order index $o(P_n)$ of a point $P_n$ is then obtained by:

$$o(P_n) = \phi_n^* K + \lambda_n$$

where K is the number of sensors.

On FIG. 5, an example of a coarse representation is depicted. The coarse representation is defined in the discrete two-dimensional coordinate $(\phi, \lambda)$ space. A point of the coarse representation, denoted a coarse point, associated with the coordinates $(\phi, \lambda)$ is said occupied (black points) by a sensed point of the point cloud when said point of the point cloud has been sensed by a sensor, associated with the sensor index $\lambda$, with an azimuthal angle $\phi$. Some other coarse points (potential locations of the coarse representation) are said unoccupied (white points) when none of the sensed points of the point cloud corresponds to the coordinates of these potential locations in the discrete two-dimensional coordinate $(\phi, \lambda)$ space.

Encoding point cloud geometry data comprises encoding the occupancies of the coarse points of the coarse representation by encoding order index differences $\Delta o_n$ representing, each, a difference between order indices of two consecutive points $P_{n-1}$ and $P_n$ are obtained by:

$$\Delta o_n = o(P_n) - o(P_{n-1})$$

The order index $o(P_1)$ of the first point $P_1$ may be directly coded into a bitstream. This is equivalent to arbitrary setting the order index of a virtual zero-th point to zero, i.e. $o(P_0)=0$, and coding $\Delta o_1 = o(P_1) - o(P_0) = o(P_1)$.

Given the order index $o(P_1)$ of the first point and the order differences $\Delta o_n$, one can recursively reconstruct the order index $o(P_n)$ of any point $P_n$ by:

$$o(P_n) = o(P_{n-1}) + \Delta o_n$$

Order index differences $\Delta_{on}$ are binarized and the obtained binary data $f_j$ are context-adaptive entropy encoded as follows: for each binary data $f_j$, a context is selected based on a difference $C_j$ between an azimuthal angle $\phi^j$ associated with the binary data $f_j$ and an azimuthal angle of an already encoded point, and the binary data $f_j$ is context-adaptive entropy coded based on the selected context.

In the example of FIG. 5, the order index difference $\Delta o_n$ equals 8 and is binarized into nine binary data $f_0$ to $f_8$ all not equal to a value PV (typically PV=1) except the last one $f_8$ which equals to PV. This binarization is a unary coding of the value of $\Delta o_n$. Azimuthal angles $\phi^0$ to $\phi^6$ respectively associated with binary data $f_0$ to $f_6$ are equal to the azimuthal angle $\phi_{n-1}$ and azimuthal angles $\phi^7$ and $\phi^8$ respectively associated with $f_7$ and $f_8$ are equal to $\phi_n$.

For example, a difference $C_j$ associated with a binary data $f_j$ is calculated between an index of an azimuthal angle $\phi^j$ associated with the binary data $f_j$ and an index of an azimuthal angle $\phi_{penult,j}$ associated with a penultimate already coded point $\phi_{penult,j}$ with a same sensor index as the sensor index kA associated with the binary data $f_j$. The current point $P_{n-1}$ is never considered in the set of already coded points from which the penultimate already coded point $P_{penult,0}$ is determined:

$$C_j = \phi^j - \phi_{penult,j}$$

On FIG. 5, the distance $C_0$ equals 0 because last and penultimate already coded point with sensor index equals to $\lambda^0=\lambda_{n-1}=2$ (by convention the sensor indexing starts from 0), are located at the same angular location $\phi^0=\phi_{n-1}$ as the current point $P_{n-1}$; this may happen in some specific sensor configuration. Then, $C_1=4$ because the difference between, on one hand, the azimuthal angles $\phi P_{penult,3}$, associated with the penultimate already coded point (grey point) with the sensor index $\lambda^1=\lambda_{n-1}+1=3$ associated with $f_1$, and, on the other hand, $\phi^1=\phi_{n-1}$ equals 4. Then, $C_2=3$ because the difference between the azimuthal angles $\phi_{penult,4}$ associated with the penultimate already coded point with the sensor index $\lambda^2=\lambda_{n-1}+2=4$ associated with $f_2$, and $\phi^2=\phi_{n-1}$ equals 3, and so on. Further, $C_7=3$ because the difference between the azimuthal angles $\phi_{penult,0}$ associated with the penultimate already coded point with the sensor index $\lambda^7=\lambda_{n-1}+7=9=0$ mod K (here K=9) associated with $f_7$ and $\phi^7=\phi_{n-1}+1$ equals 3. Finally, $C_8=2$ because the difference between the azimuthal angles $\phi P_{penult,1}$ associated with the penultimate already coded point with the sensor index $\lambda^8=\lambda_{n-1}+8=10=1$ mod K associated with $f_8$ and $\phi^8=\phi_{n-1}$ equals 2.

Then, a context index ctxIdx of a table of contexts may be selected as equal to $C_j$ but, in order to limit the number of contexts, one may cap the context index by a threshold th1 as $$\text{ctxIdx}=\min(C_j, th1).$$

Context-adaptive entropy encoding a binary flag f; comprises selecting a context by some selection process based on already coded information. The context is selected based on neighborhood occupancy configurations associated with the current coarse point, i.e. a set of coarse points belonging to a causal neighborhood relative to the binary data $f_j$ to be entropy encoded.

A drawback of prior arts is their inability to use a big neighborhood, big enough to encompass most of (or all) local occupancy correlations, to code the occupancy data of either a node/cube/voxel (three-dimensional geometrical element) in the voxel or octree representation or of a coarse point (two-dimensional geometrical element) in the coarse representation.

In practice, using a big neighborhood involves a too high number of possible neighborhood occupancy configurations to be used directly in selecting a context that is usually used for entropy coding the occupancy data (for example the binary information $f_j$) of a current two- or three-dimensional geometrical element.

Several techniques have been proposed to reduce the number of possible neighborhood occupancy configurations.

Firstly, some "physical" arguments have been introduced like the masking of an occupied neighbor by another occupied neighbor placed between the former and the current node/cube/voxel; in this case the information of the former is discarded because this information is supposed to be weaker than the information of the latter.

Secondly, based on learning, local reductions have been proposed but the building of the local reduction depends much on the type of learned point clouds. The local reductions may be implemented using Look-Up-Tables (LUT) of limited size.

Thirdly, a more flexible technique named OBUF (Optimal Binary Coder with Update on the Fly) has been introduced to reduce the number of contexts of the entropy coder by using a limited number of adaptive entropy coders (say 32), by associating a coder index (say 0 to 31) with each neighborhood occupancy configuration, and, after each coding of the occupancy data of a current node, updating the coder index associated with the neighborhood occupancy configuration of the current node. More details of OBUF in the ACM paper entitled "Using neighboring nodes for the compression of octrees representing the geometry of point clouds" (S. Lasserre et al., ACM MMSys'19, June 2019, Amherst, Massachusetts, USA).

The OBUF scheme has been combined with the first reduction technique, applied before OBUF, to limit the number of coder (context) indices that are dependent on reduced neighborhood occupancy configurations.

One of the problems to be solved is to allow the usage of a big neighborhood of a current geometrical element (node/voxel/coarse point), big enough to encompass most of (or all) local occupancy correlations, to select an entropy coder context for coding the occupancy data of a current geometrical element while maintaining the number of contexts reasonably low for practical implementation and meaningful context statistics.

The problem is not only the difficulty of implementation (due mostly to memory access) of a high number of contexts, but also to see contexts being individually rarely visited, consequently leading to poor statistics and then to badly adapted probabilities used for the coding of the occupancy data by the entropy coder. This leads to overall poor compression capability.

For example, a neighborhood involving 20 neighbors (which actually is not many neighbors in a three-dimensional space) would lead to $2^{20}=1$ million possible neighborhood occupancy configurations. Consequently, when dealing with typical point clouds having a few millions of points at most, many of the neighborhood occupancy configurations will be visited a very limited number of times and it becomes impossible to build reliable statistics per neighborhood occupancy configuration.

The prior art does not provide satisfactory solutions.

Solutions based on neighbor masking and reduction LUT are specific to some types of contents. Anyway, LUT with millions of entries are not practical and are trained on a specific type of contents.

Also, OBUF reduces the number of entropy coders (or equivalently of contexts) but the number of coder indices is equal to the number of (reduced) neighborhood occupancy configurations and having millions of coder indices is also impractical.

For these reasons, the prior art has all worked with a spatially very limited neighborhood.

At least one embodiment of the present application has been devised with the foregoing in mind.

SUMMARY

The following section presents a simplified summary of at least one embodiment in order to provide a basic understanding of some aspects of the present application. This summary is not an extensive overview of an embodiment. It is not intended to identify key or critical elements of an embodiment. The following summary merely presents some aspects of at least one of the embodiments in a simplified form as a prelude to the more detailed description provided elsewhere in the document.

According to a first aspect of the present application, there is provided a method of encoding, into a bitstream, point cloud geometry data represented by geometrical elements occupying some discrete positions of a set of discrete positions of a multi-dimensional space. The method comprises obtaining a series of at least one binary data representative of an occupancy data of at least one neighboring geometrical element belonging to a causal neighborhood of a current geometrical element of the multi-dimensional space; obtaining a first index from the series of at least one binary data, the first index being representative of a neighborhood occupancy configuration among a first set of neighborhood occupancy configuration indices representative of potential neighborhood occupancy configurations; obtaining a second index by applying an index range reduction function to the first index; the second index is representative of the neighborhood occupancy configuration among a second set of neighborhood occupancy configuration indices representative of the potential neighborhood occupancy configurations; the index range reduction function is adapted to map each index of the first set of neighborhood occupancy configuration indices to an index of the second set of neighborhood occupancy configuration indices; and the range of the second set of neighborhood occupancy configuration indices being lower than the range of the first set of neighborhood occupancy configuration indices; and entropy encoding, into the bitstream, at least one binary data representative of an occupancy data of the current geometrical element based on the second index.

According to a second aspect of the present application, there is provided a method of decoding, from a bitstream, point cloud geometry data represented by geometrical elements occupying some discrete positions of a set of discrete positions of a multi-dimensional space.

The method comprises obtaining, a series of at least one binary data based on occupancy data of precedingly decoded geometrical elements belonging to a causal neighborhood of a current geometrical element of the multi-dimensional space; obtaining a first index from the series of at least one binary data, the first index being representative of a neighborhood occupancy configuration among a first set of neighborhood occupancy configuration indices representative of potential neighborhood occupancy configurations; obtaining a second index by applying an index range reduction function to the first index; the second index is representative of the neighborhood occupancy configuration among a second set of neighborhood occupancy configuration indices representative of the potential neighborhood occupancy configurations; the index range reduction function is adapted to map each index of the first set of neighborhood occupancy configuration indices to an index of the second set of neighborhood occupancy configuration indices; and the range of the second set of neighborhood occupancy configuration indices being lower than the range of the first set of neighborhood occupancy configuration indices; and entropy decoding, from the bitstream, at least one binary data representative of an occupancy data of the current geometrical element based on the second index.

According to a third aspect of the present application, there is provided an apparatus of encoding, into a bitstream, point cloud geometry data represented by geometrical elements occupying some discrete positions of a set of discrete positions of a multi-dimensional space.

The apparatus comprising one or more processors configured to carry out a method according to the first aspect of the present application.

According to a fourth aspect of the present application, there is provided an apparatus of decoding, from a bitstream, point cloud geometry data represented by geometrical elements occupying some discrete positions of a set of discrete positions of a multi-dimensional space.

The apparatus comprising one or more processors configured to carry out a method according to the second aspect of the present application.

According to a fifth aspect of the present application, there is provided a non-transitory computer-readable storage medium carrying instructions of program code for executing a method according to the first aspect of the present application.

According to a sixth aspect of the present application, there is provided a non-transitory computer-readable storage medium carrying instructions of program code for executing a method according to the second aspect of the present application.

The specific nature of at least one of the embodiments as well as other objects, advantages, features and uses of said at least one of embodiments will become evident from the following description of examples taken in conjunction with the accompanying drawings.

BRIEF DESCRIPTION OF THE DRAWINGS

Reference will now be made, by way of example, to the accompanying drawings which show embodiments of the present application, and in which.

Similar reference numerals may have been used in different figures to denote similar components.

DESCRIPTION OF EMBODIMENTS

Figure 1:
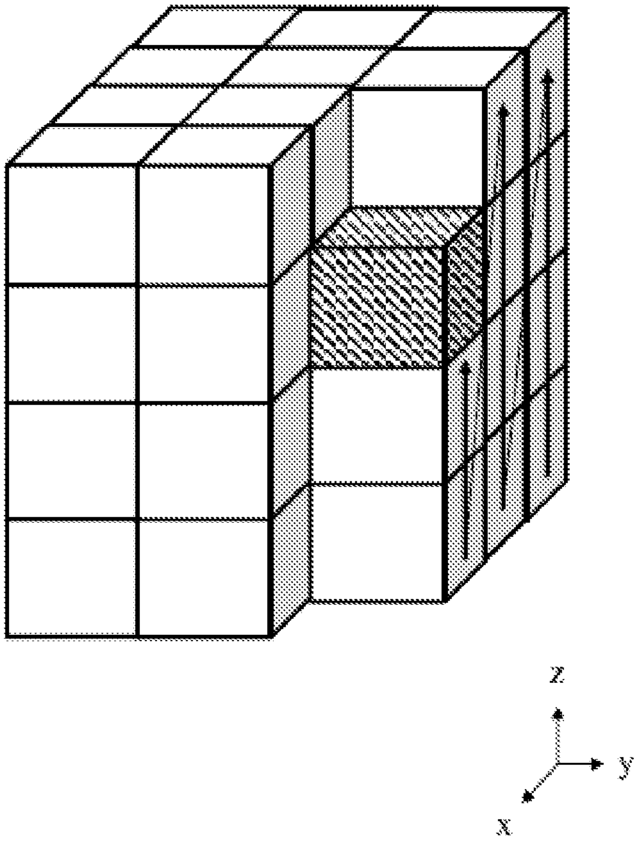
FIG. 1 shows schematically an example of a voxel representation in accordance with prior art.
Figure 2:
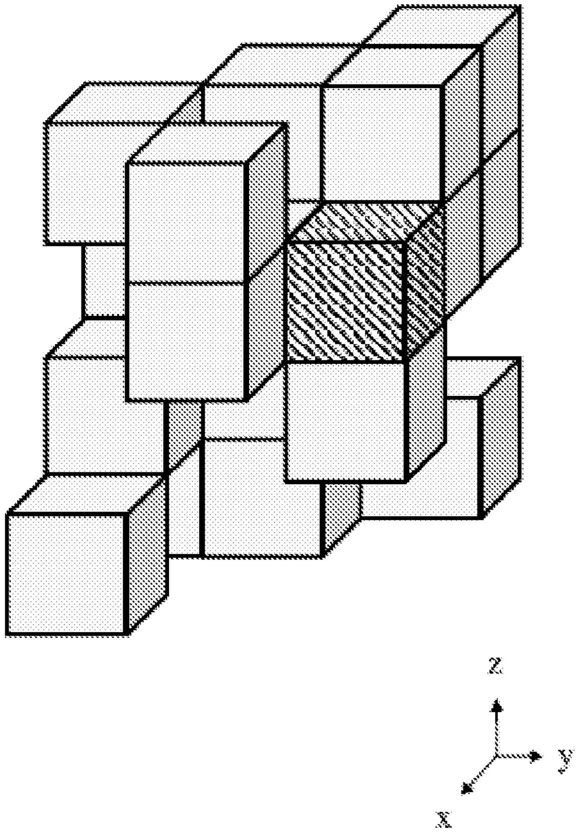
FIG. 2 shows schematically an example of a neighborhood occupancy configuration in accordance with prior art.
Figure 3:
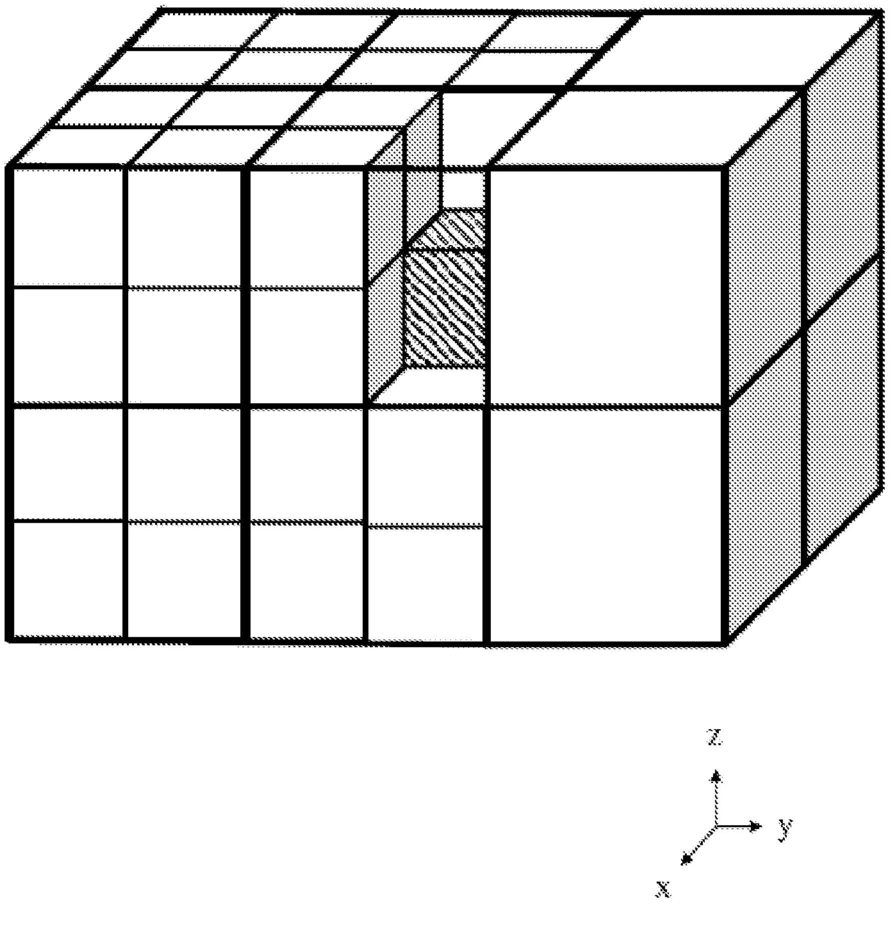
FIG. 3 shows schematically an example of the occupancy data of nodes at higher depth in accordance with prior art.
Figure 4:
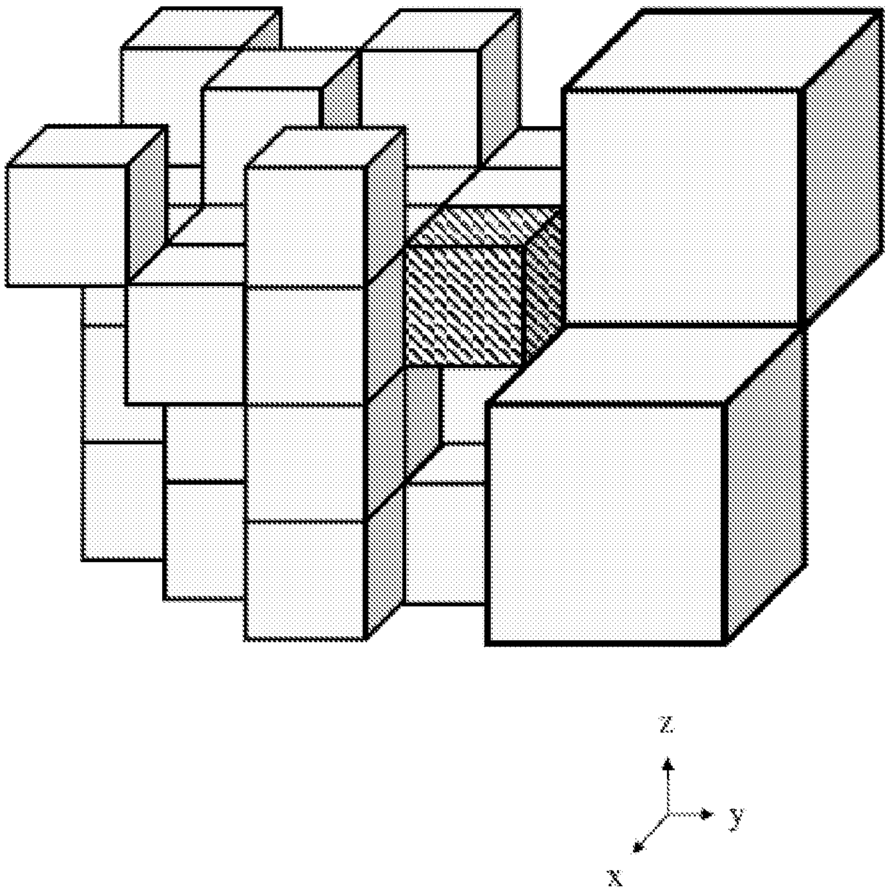
FIG. 4 shows schematically an example of a neighborhood occupancy configuration when neighboring nodes of depth higher than the current depth are also involved in accordance with prior art.
Figure 5:
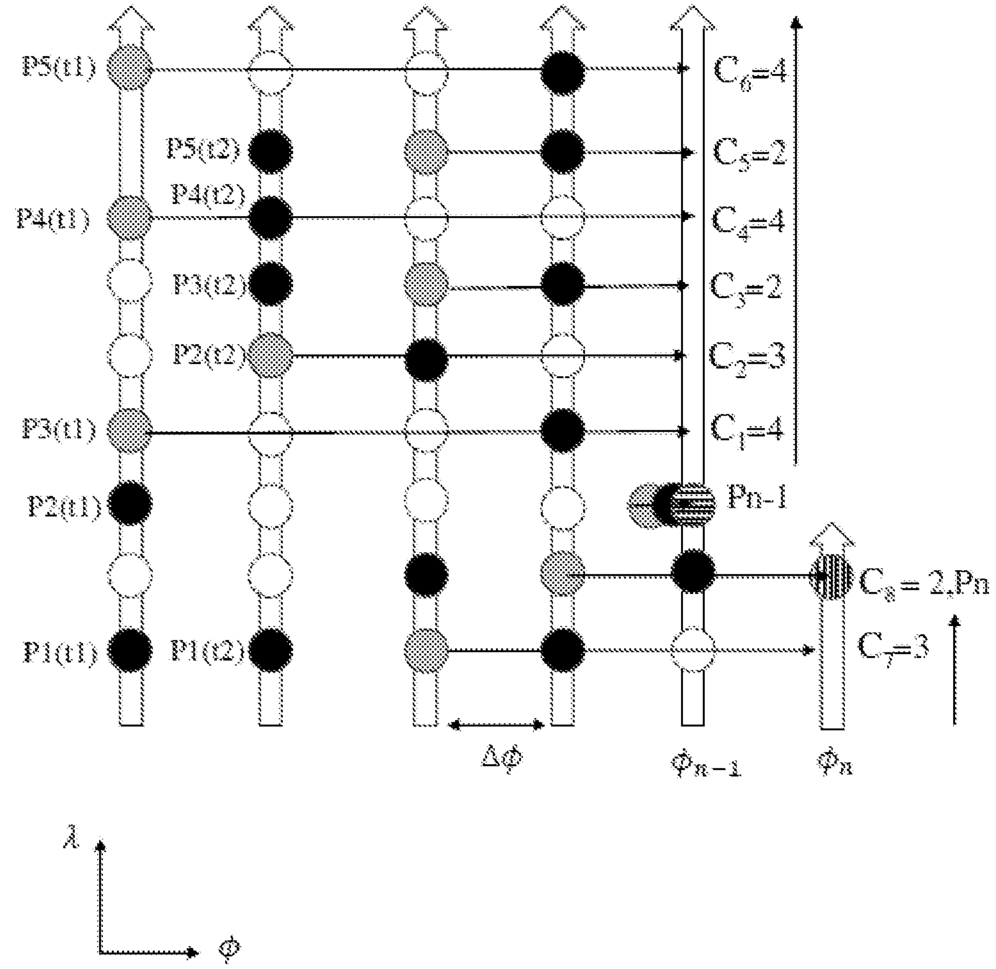
FIG. 5 shows schematically a coarse representation in accordance with prior art.

At least one of the embodiments is described more fully hereinafter with reference to the accompanying figures, in which examples of at least one of the embodiments are depicted. An embodiment may, however, be embodied in many alternate forms and should not be construed as limited to the examples set forth herein. Accordingly, it should be understood that there is no intent to limit embodiments to the particular forms disclosed. On the contrary, the disclosure is intended to cover all modifications, equivalents, and alternatives falling within the spirit and scope of the present application.

At least one of the aspects generally relates to point cloud encoding and decoding, one other aspect generally relates to transmitting a bitstream generated or encoded and one other aspects relates to receiving/accessing a decoded bitstream.

According to a first aspect of the present application, there is provided a method of encoding, into a bitstream, point cloud geometry data represented by geometrical elements occupying some discrete positions of a set of discrete positions of a multi-dimensional space. The method comprises obtaining a series of at least one binary data representative of an occupancy data of at least one neighboring geometrical element belonging to a causal neighborhood of a current geometrical element of the multi-dimensional space; obtaining a first index from the series of at least one binary data, the first index being representative of a neighborhood occupancy configuration among a first set of neighborhood occupancy configuration indices representative of potential neighborhood occupancy configurations; obtaining a second index by applying an index range reduction function to the first index; the second index is representative of the neighborhood occupancy configuration among a second set of neighborhood occupancy configuration indices representative of the potential neighborhood occupancy configurations; the index range reduction function is adapted to map each index of the first set of neighborhood occupancy configuration indices to an index of the second set of neighborhood occupancy configuration indices; and the range of the second set of neighborhood occupancy configuration indices being lower than the range of the first set of neighborhood occupancy configuration indices; and entropy encoding, into the bitstream, at least one binary data representative of an occupancy data of the current geometrical element based on the second index.

According to a second aspect of the present application, there is provided a method of decoding, from a bitstream, point cloud geometry data represented by geometrical elements occupying some discrete positions of a set of discrete positions of a multi-dimensional space. The method comprises obtaining, a series of at least one binary data based on occupancy data of precedingly decoded geometrical elements belonging to a causal neighborhood of a current geometrical element of the multi-dimensional space; obtaining a first index from the series of at least one binary data, the first index being representative of a neighborhood occupancy configuration among a first set of neighborhood occupancy configuration indices representative of potential neighborhood occupancy configurations; obtaining a second index by applying an index range reduction function to the first index; the second index is representative of the neighborhood occupancy configuration among a second set of neighborhood occupancy configuration indices representative of the potential neighborhood occupancy configurations; the index range reduction function is adapted to map each index of the first set of neighborhood occupancy configuration indices to an index of the second set of neighborhood occupancy configuration indices; and the range of the second set of neighborhood occupancy configuration indices being lower than the range of the first set of neighborhood occupancy configuration indices; and entropy decoding, from the bitstream, at least one binary data representative of an occupancy data of the current geometrical element based on the second index.

In an embodiment, the index range reduction function is a hashing function.

In an embodiment, said at least one binary data is encoded or decoded by a binary arithmetic coder or decoder using an internal probability based on at least the second index.

In an embodiment, encoding or decoding said at least one binary data comprises selecting a context among a set of contexts based on at least the second index.

In an embodiment, selecting the context further depends on predictors of said at least one binary data.

In an embodiment, encoding or decoding the at least one binary data representative of the occupancy data of the current geometrical element comprises obtaining a context index as an entry of a context index table determined from at least the second index; obtaining a context associated with a probability as the entry, associated with the context index, of a context table comprising the set of contexts; entropy encoding into the bitstream or entropy decoding from the bitstream, the at least one binary data using the probability; and updating the entry of the context index table based on the encoded or decoded binary data to a new value.

In an embodiment, the geometrical elements are defined in a two-dimensional space.

In an embodiment, the geometrical elements are defined in a three-dimensional space.

In some embodiments, there is provided an apparatus of encoding, into a bitstream, point cloud geometry data represented by geometrical elements occupying some discrete positions of a set of discrete positions of a multi-dimensional space. The apparatus comprising one or more processors configured to carry out a method according to the first aspect of the present application.

In some embodiments, there is provided an apparatus of decoding, from a bitstream, point cloud geometry data represented by geometrical elements occupying some discrete positions of a set of discrete positions of a multi-dimensional space. The apparatus comprising one or more processors configured to carry out a method according to the second aspect of the present application.

In some embodiments, there is provided a computer program product including instructions which, when the program is executed by one or more processors, causes the one or more processors to carry out a method according to the first aspect of the present application.

In some embodiments, there is provided a non-transitory computer-readable storage medium carrying instructions of program code for executing a method according to the first aspect of the present application.

In some embodiments, there is provided a computer program product including instructions which, when the program is executed by one or more processors, causes the one or more processors to carry out a method according to the second aspect of the present application.

In some embodiments, there is provided a non-transitory computer-readable storage medium carrying instructions of program code for executing a method according to the second aspect of the present application.

Moreover, the present aspects are not limited to MPEG standards such as MPEG-I part 5 or part 9 that relate to the Point Cloud Compression, and may be applied, for example, to other standards and recommendations, whether pre-existing or future-developed, and extensions of any such standards and recommendations (including MPEG-I part 5 and part 9). Unless indicated otherwise, or technically precluded, the aspects described in the present application may be used individually or in combination.

In brief, the present invention relates to encoding/decoding point cloud geometry data represented by geometrical elements occupying some discrete positions of a set of discrete positions of a multi-dimensional space. At least one binary data is obtained. The at least one binary data is representative of an occupancy data of neighboring geometrical elements belonging to a causal neighborhood of a current geometrical element of the multi-dimensional space. A first index is then obtained from the at least one binary data. The first index is representative of a neighborhood occupancy configuration among a first set of neighborhood occupancy configuration indices representative of potential neighborhood occupancy configurations. A second index is obtained by applying an index range reduction function to the first index. The second index is representative of the neighborhood occupancy configuration among a second set of neighborhood occupancy configuration indices representative of the potential neighborhood occupancy configurations. The index range reduction function is adapted to map each index of the first set of neighborhood occupancy configuration indices to an index of the second set of neighborhood occupancy configuration indices. The range (cardinality) of the second set of neighborhood occupancy configuration indices is lower than the range (cardinality) of the first set of neighborhood occupancy configuration indices. At least one binary data representative of an occupancy data of the current geometrical element is entropy encoded based on the second index.

An ideal index range reduction function should be easy to compute and it should take a high number of entries and "randomly mixes" neighborhood occupancy configurations. The rationale behind randomness being an efficient choice is as follows. For a given type of point clouds, a few neighborhood occupancy configurations will be visited much more often than the vast majority of others. For example, Augmented RealityNirtual Reality point clouds representing surfaces will tend to visit neighborhood occupancy configurations with occupied adjacent neighbors. Sparse point clouds will tend to visit neighborhood occupancy configurations with a few occupied neighbors. Volumetric point clouds will tend to visit neighborhood occupancy configurations with most of neighbors being occupied. By a random mixing nature of the index range reduction function, none of the types of point cloud is privileged and it is likely that often visited configurations do not collide by having a same reduced neighborhood occupancy configuration after having applied the function. Therefore, visiting statistics are well preserved. Practically, an index range reduction function may be selected to ensure that visiting statistics are preserved for a large class of realistic point clouds.

The present invention applies to any type of two- or three-dimensional geometrical elements defined in any representation used for representing point cloud geometry data. For example, a geometrical element may be a voxel in a voxel representation, a node of a tree representing the point cloud geometry data, or a coarse point of a coarse representation.

Figure 6:
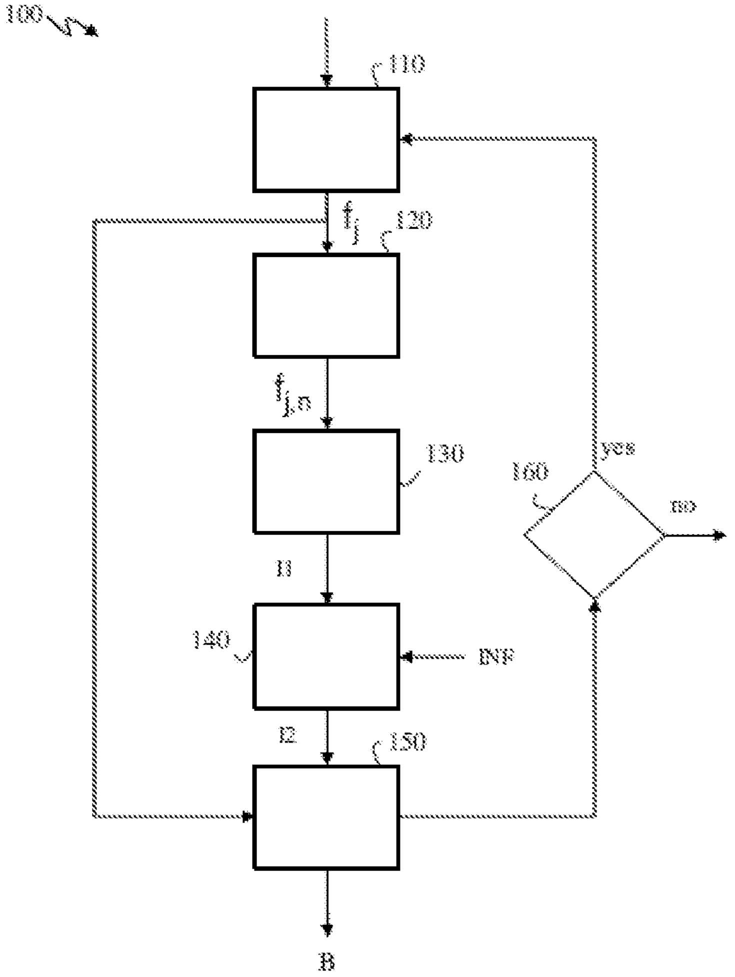
FIG. 6 shows a schematic block diagram of steps of a method 100 of encoding point cloud geometry data into a bitstream of encoded point cloud data in accordance with at least one embodiment.

FIG. 6 shows a schematic block diagram of steps of a method 100 of encoding point cloud geometry data into a bitstream of encoded point cloud data in accordance with at least one embodiment.

A current geometrical element representative of a part of the point cloud geometry data is considered.

In step 110, a binary data $f_j$ representative of the occupancy data of the current geometrical element is obtained.

In step 120, a series (indexed by n) of at least one binary data $f_{j,n}$ representative of an occupancy data of at least one neighboring geometrical element belonging to a causal neighborhood of the current geometrical element, is obtained.

In step 130, a first index 11 is obtained from the series of at least one binary data ($f_{j,n}$). The first index 11 is representative of a neighborhood occupancy configuration among a first set of neighborhood occupancy configuration indices representative of potential neighborhood occupancy configurations. A neighborhood occupancy configuration index indicates which neighbors of the causal neighborhood are occupied by at least one point of the point cloud.

In an embodiment of step 130, the first index 11 may be a word made of a concatenation of the bits $f_{j,n}$ (indexed by n) indicating the occupancy data of each of said neighbor.

In a variant, the concatenation may be performed in a predetermined order of said neighbors.

In step 140, a second index I2 is obtained by applying an index range reduction function F to the first index 11. The second index I2 is representative of the neighborhood occupancy configuration among a second set of neighborhood occupancy configuration indices representative of the potential neighborhood occupancy configurations. The index range reduction function F is adapted to map each index of the first set of neighborhood occupancy configuration indices to an index of the second set of neighborhood occupancy configuration indices. The range (cardinality) of the second set of neighborhood occupancy configuration indices being lower than the range (cardinality) of the first set of neighborhood occupancy configuration indices.

The index amplitude reduction function F should output a number of possible indices, i.e. a cardinality of the second set of neighborhood occupancy configuration indices, sufficiently big to avoid mixing unrelated neighboring statistics and, thus, to preserve compression capability.

On the other hand, the index amplitude reduction function F should output a number of possible indices sufficiently small to obtain a practical implementation in terms of tracking of the statistics and to avoid dilution of the statistics. Typically, the cardinality of the second set of neighborhood occupancy configuration indices is in the range of a few dozens to a few thousand possible neighborhood occupancy configuration indices.

In an embodiment of step 140, the index range reduction function F may be a hashing function.

In an embodiment of step 140, the hashing function may be a modulo function relative to an integer p:

$$I2 = I1 \bmod p$$

where p is preferably a prime number. By doing so there are p possible second indices.

In an embodiment of step 140, the hashing function may be a linear combination follows by a modulo relative to an integer M:

$$I2 = a * I1 \bmod M$$

where a and M are preferably relatively prime numbers. By doing so there are M possible hashed indices.

Any other hashing function may be suitable as soon as it is easy to compute and mixes well the neighborhood occupancy configurations.

The occupancies information of neighbors may not be the only useful information for encoding the occupancy data of a current geometrical element. Another information INF may be used in combination with the occupancy data of neighbors.

In one variant, the information INF is based on inter frame prediction that may provide a prediction of the occupancy data of a current geometrical element based on the motion of points of the point cloud. Such prediction information may be also used to encode the occupancy data of a current geometrical element.

In one variant, the information INF is another prediction information that may be the position of the current geometrical element within the multi-dimensional space. For example, in the coarse representation, the sensor index A carries information useful to the anticipation of occupancy data because different sensors pointing to different elevations have different occupancy statistics. Another example is the position of a node within its parent node because the geometry of the neighborhood is affected by this position.

In step 150, the binary data $f_j$, representative of an occupancy data of the current geometrical element is entropy encoded into a bitstream B based on the second index I2.

Then, the encoding method processes to the encoding of a binary data $f_j$ representative of the occupancy data of a next current geometrical element (step 160). The method ends when all geometrical elements have been considered.

Figure 7:
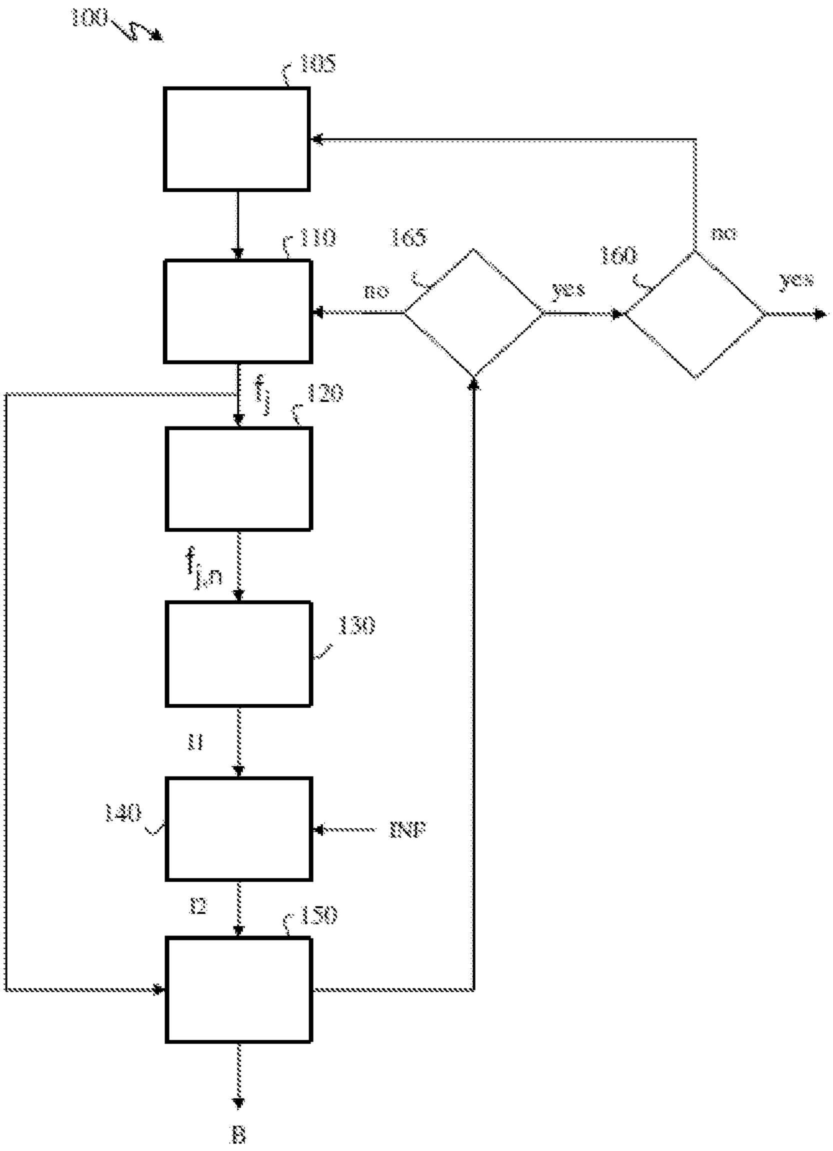
FIG. 7 shows a schematic block diagram of steps of a method 100 of encoding point cloud geometry data into a bitstream of encoded point cloud data in accordance with at least one embodiment.

In an embodiment of step 110, depicted on FIG. 7, the method 100 further comprises obtaining (step 105) at least one binary data $f_j$ to be entropy encoded by binarizing a data representative of the occupancy data of the current geometrical element. One binary data $f_j$ is obtained (step 110) and encoded (steps 120-150). A next binary data $f_j$ is obtained and encoded until all the binary data $f_j$ representative of the occupancy data of the current geometrical element are considered (step 165). Then, a new current geometrical element is considered (step 160) and at least one binary data $f_j$ is obtained (step 105) by binarizing a data representative of the occupancy data of the next current geometrical element. The method ends when all occupied geometrical elements are considered. For example, when a geometrical element is a coarse point, the location of the coarse point is represented by an index order difference coded as a series of binary data $f_j$.

Figure 8:
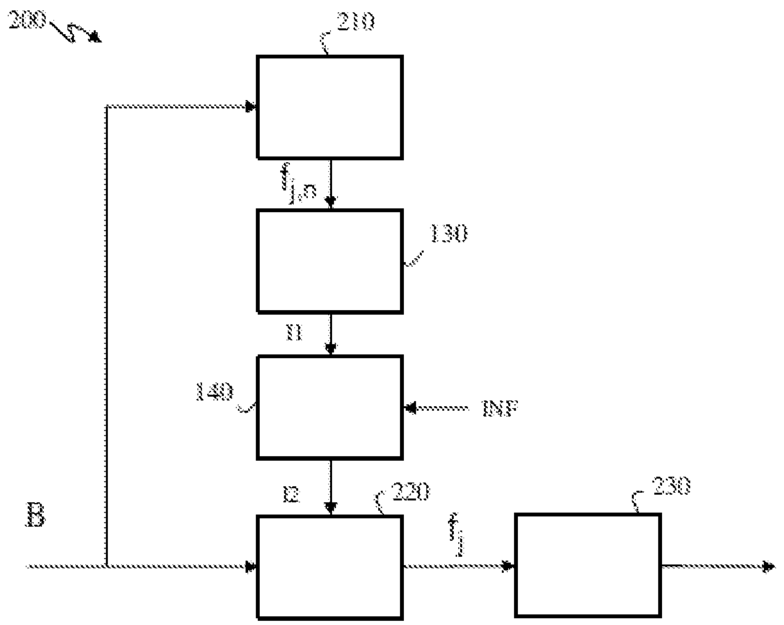
FIG. 8 shows a schematic block diagram of steps of a method 200 of decoding point cloud geometry data from a bitstream of encoded point cloud data in accordance with at least one embodiment.

FIG. 8 shows a schematic block diagram of steps of a method 200 of decoding point cloud geometry data from a bitstream of encoded point cloud data in accordance with at least one embodiment.

The decoding method 200 is straightforwardly deduced from the encoding method 100.

In step 210, a series (indexed by n) of at least one binary data $f_{j,n}$ is obtained based on occupancy data of precedingly decoded geometrical elements belonging to a causal neighborhood of a current geometrical element of the multi-dimensional space.

A second index I2 is obtained from steps 130 and 140.

In step 220, one binary data $f_j$ representative of the occupancy data of the current geometrical element is entropy decoded from the bitstream B based on the second index I2.

Then, the decoding method processes to the decoding of a binary data $f_j$ representative of the occupancy data of a next geometrical element indicated by the bitstream B. The method ends when all geometrical elements have been considered.

In an embodiment of the method 200, in step 230, a data representative of the occupancy data of the current geometrical element is obtained from at least one decoded binary data $f_j$. When a data representative of the occupancy data of the current geometrical element is obtained, a new binary data $f_j$ is decoded from the bitstream until all the binary data $f_j$ of a new data are have been obtained. Said new data is obtained from at least one decoded binary data $f_j$ and so on until all the binary data $f_j$ are decoded from the bitstream. For example, when a geometrical element is a coarse point, the occupancy data of the coarse point is represented by an index order difference coded as a series of binary data $f_j$.

In an embodiment of step 150, respectively 220, a binary data $f_j$ is encoded, respectively decoded, by a binary arithmetic coder, respectively decoder, using a probability pr of a binary data $f_j$ to be true ($f_j$=1) based on the second index I2. In this case, the second index I2 may point to the 12-th element of a table T of probabilities such that pr=T[I2]. The probability T[I2] may be updated after the coding of the binary data $f_j$ depending on its value (false vs true or 0 vs 1).

Figure 9:
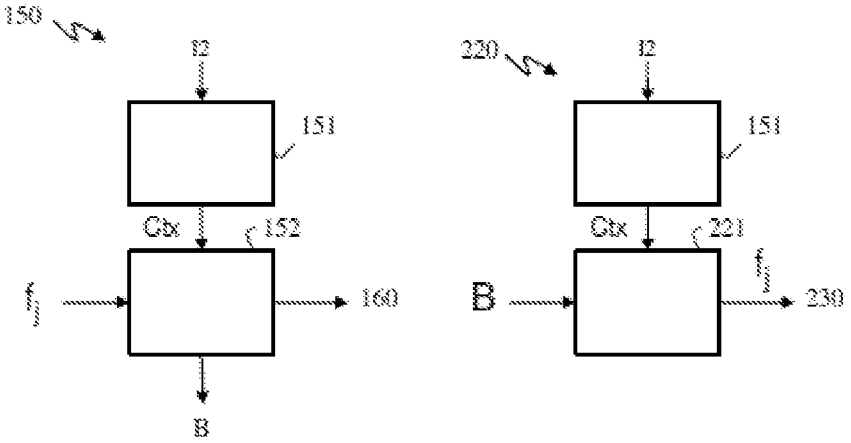
FIG. 9 shows schematically the step 150 of the method 100, respectively the step 220 of the method 200, in accordance with at least one embodiment.

In an embodiment step 150, respectively 220, depicted on FIG. 9, a binary data $f_j$ is context-based adaptive entropy encoded, respectively decoded. Said context-based adaptive entropy encoding, respectively decoding comprises selecting (step 151) a context Ctx from at least the second index I2. The context Ctx may be selected from a table T of contexts based on the second index I2 such that Ctx=T[I2].

In step 152, the binary data $f_j$ is context-based entropy coded into the bitstream B based on the selected context Ctx. In step 221, the binary data $f_j$ is context-based entropy decoded based on the selected context Ctx.

Figure 10:
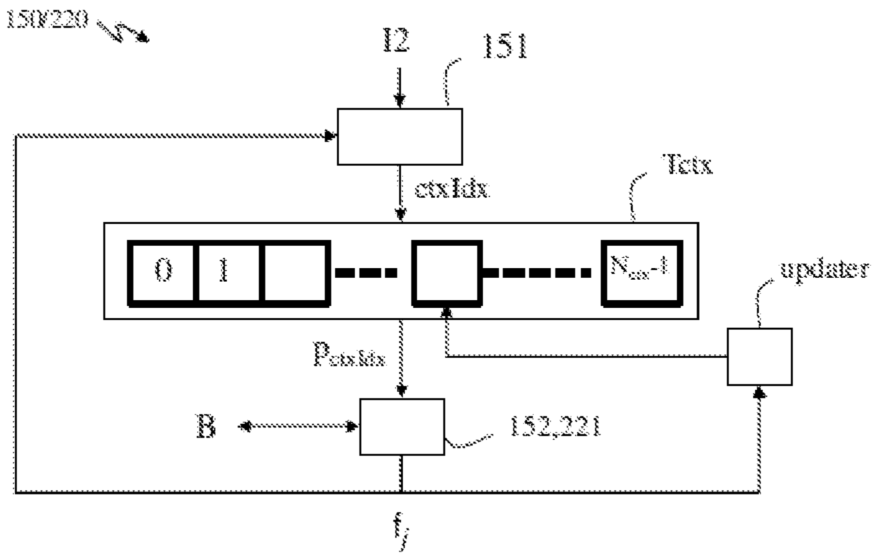
FIG. 10 shows schematically a variant of the step 150 of the method 100, respectively the step 220 of the method 200 of FIG. 9.

In one variant, depicted on FIG. 10, the binary data $f_j$ is context-based adaptive entropy encoded or decoded by a Context-Adaptive Binary Arithmetic Coder or decoder (CABAC).

In step 151, the context Ctx is selected by some selection process based at least on the second index I2 to provide a context index ctxIdx associated with a binary data $f_j$.

A context table Tctx with $N_{ctx}$ entries usually store probabilities associated with the contexts and a probability $p_{ctxIdx}$ is obtained as the ctxIdx-th entry of the context table. The context is selected based at least on the second index I2 by $$Ctx = \text{Tctx}[\text{ctxIdx}].$$

For example, the context index ctxIdx may be equal to the second index I2 such that the context Ctx is selected as $$Ctx = \text{Tctx}[I2].$$

In step 152, respectively 221, a binary data $f_j$ is entropy encoded in the bitstream B, respectively entropy decoded from the bitstream B, using the probability $p_{ctxIdx}$.

Entropy coders are usually arithmetic coders but may be any other type of entropy coders like asymmetric numeral systems. In any case, optimal coders add $-\log2(p_{ctxIdx})$ bits in the bitstream B to encode $f_j=1$ or $-\log 2(1-p_{ctxIdx})$ bits in the bitstream B to encode $f_j=0$. Once the binary data $f_j$ is encoded (decoded) the probability $p_{ctxIdx}$ is updated by using an updater taking the encoded binary data $f_j$ and $p_{ctxIdx}$ as entries; the updater is usually performed by using updated tables. The updated probability replaces the ctxIdx-th entry of the context table Tctx. Then, another binary data $f_j$ can be encoded, and so on. The update loop back to the context table is a bottleneck in the coding workflow as another symbol can be encoded only after the update has been performed. For this reason, the memory access to the context table must be as quick as possible and minimizing the size of the context table helps easing its hardware implementation.

A Context-Adaptive Binary Arithmetic decoder performs essentially the same operations as the Context-Adaptive Binary Arithmetic encoder except that the coded binary data $f_j$ is decoded from the bitstream B by an entropy decoder using the probability $p_{ctxIdx}$.

Selecting an adequate context, i.e. the probability $p_{ctxIdx}$ that estimates at best the chance of the binary data $f_j$ to be equals to 1, is essential to obtain good compression. Therefore, the context selection should use the occupancy data of at least one neighboring geometrical element belonging to a causal neighborhood of a current geometrical element, and correlation between them to obtain this adequate context.

Figure 11:
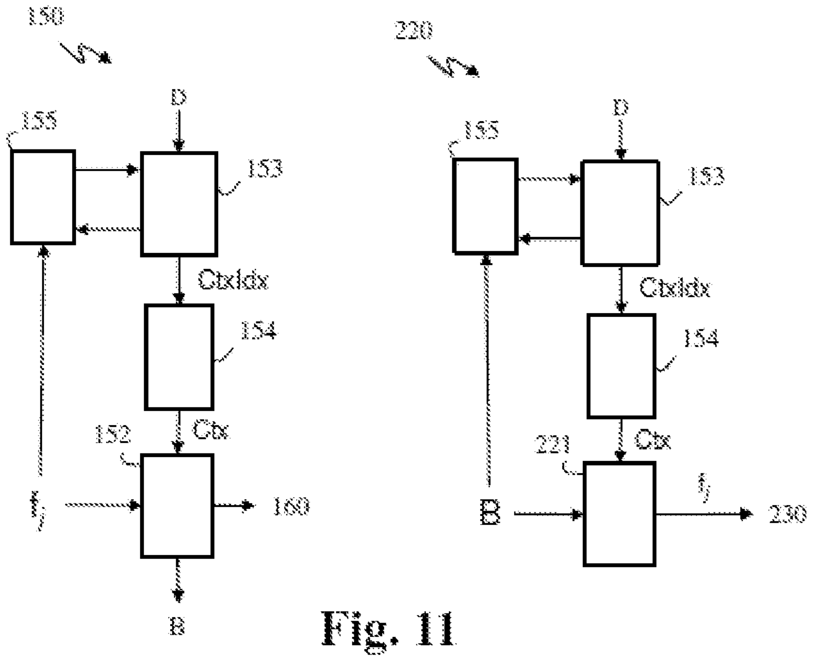
FIG. 11 shows schematically the step 150 of the method 100, respectively the step 220 of the method 200 in accordance, with at least one embodiment.

In an embodiment of step 150, respectively of step 220, depicted on FIG. 11, a binary data $f_j$ is encoded, respectively decoded, by a binary arithmetic coder, respectively decoder, with an evolving internal probability and on the base of a context Ctx selected among contexts $C_i, \ldots, C_N$, like CABAC.

In step 153, a context index CtxIdx is selected based on a dependency state D of a set $D_j$, indexed by j from the binary data $f_j$. A set $D_j$ may comprise at least the second index I2:

$$D_j = \{b_{j,0}, \ldots, b_{j,j-1}, I_2\}$$

where $b_{j,0}, \ldots, b_{j,j-1}$ are the binary data representative of the occupancies of some neighboring geometrical elements belonging to a causal neighborhood of the current geometrical element. In one variant, the set $D_j$ of dependency states may comprise predictors for the binary data $f_j$:

$$D_j = \{P_1, \ldots, P_K, I_2\}$$

In one embodiment of the later variant, when the geometrical element is a node of an octree, an occupancy score $\text{score}_m$ is computed for each of the eight sub-nodes $SN_m$ (m=0, . . . ,7) of the current node (current geometrical element) by using a weighted sum over the 26 neighbors that share a face, an edge or a vertex with the current node:

$$\text{score}_m = \frac{1}{26}\sum_{k=1}^{26} w_{k,m}(\delta_k)$$

where m is the sub-node index, k is a neighbor index, $w_{k,m}$ is the contribution (weight) from neighbour k to sub-node m, and $\delta_k$ is the occupancy data (0 for unoccupied, 1 for occupied) of the neighbour k. The score is transformed into a ternary information $\text{Pred}_m$ belonging to the set {"predicted unoccupied", "predicted occupied", "not predicted" } of three prediction states by using two thresholds th0(No) and th1(No) that depend upon the number No of occupied neighbors. If the score $\text{score}_m$ is lower than th0(No), then $\text{Pred}_m$ is set to "predicted unoccupied"; if the score $\text{score}_m$ is higher than th1(No), then $\text{Pred}_m$ is set to "predicted occupied"; otherwise the score is between the two thresholds and $\text{Pred}_m$ is set to "not predicted".

Neighborhood may not be the only useful information for predicting the occupancy data of a current geometrical element.

For example, inter frame prediction may provide a prediction of occupancy data based on the motion of points of the point cloud.

Another prediction information may be the position of the element within the geometrical representation.

For example, when the geometrical element is a coarse point in the two-dimensional angular space, the sensor index A carries information useful to the anticipation of occupancy data because different sensors pointing to different elevations have different occupancy statistics.

Another example is the position of a node within its parent node because the geometry of the neighborhood is affected by this position.

In one embodiment of step 153 of FIG. 11, the context index CtxIdx may be an entry of a context index table L:

$$\text{CtxIdx} = L[D]$$

where the context index table L has as many entries as the cardinality of the set $D_j$ of dependency states.

In step 154, a context table Tctx with $N_{ctx}$ entries stores the probabilities associated with the contexts, and a context Ctx associated with a probability $p_{ctxIdx}$ is obtained as the ctxIdx-th entry of the context table by:

$$Ctx = \text{Tctx}[\text{CtxIdx}].$$

In step 152, the binary data $f_j$ is encoded in the bitstream B by an entropy coder using the probability $p_{ctxIdx}$ as above explained.

In step 221, the binary data $f_j$ is decoded from the bitstream B by an entropy decoder using the probability $p_{ctxIdx}$ as above explained.

In step 155, the D-th entry of the context index table L[D] is updated from the encoded binary data $f_j$ to a new value $L_{updated}[D]$.

In one variant, the update may be performed based on a model of a memory channel such as $$L_{updated}[D] = (M^*L[D] + f_j)/(M + 1)$$

where M is the length of the memory and the binary data $f_j$ value is either 0 or 1 depending on the occupancy data of the current element.

In one variant, a memory channel may be implemented by using two other fixed look Up Tables LM0 and LM1 by $$L_{updated}[D]=LM0[L[D]] \text{ if } f_j=0,$$

$$L_{updated}[D]=LM1[L[D]] \text{ if } f_j=1.$$

The associated decoder performs essentially the same operations the encoder except that the encoded binary data $f_j$ is decoded from the bitstream B by an entropy decoder using the probability $p_{ctxIdx}$.

In an embodiment, the geometrical elements are defined in a three-dimensional space.

For example, the geometrical elements may be nodes/cubes of a tree representing point cloud geometry data or voxels of a vowel representation of point cloud geometry data.

In an embodiment, the geometrical elements are defined in a two-dimensional space.

For example, the geometrical elements may be occupied coarse points of a coarse representation defined in a two-dimensional coordinate space.

Said coarse representation may be defined as the coarse representation of the L3C2 codec as above discussed, i.e. a coarse representation dedicated to Lidar-sensed point clouds.

However, the coarse representation may also be defined for any types of sensors head including rotating or non-rotating sensors heads. A sensing path is defined from sensor characteristics in a two-dimensional angular coordinate (ϕ, θ) space comprising an azimuthal coordinate ϕ representative of an azimuthal angle representing a sensing angle of a sensor relative to a referential and an elevation coordinate θ representative of an elevation angle of a sensor relative to a horizontal referential plane. The sensing path is used to sense the points of the point cloud according to ordered coarse points representing potential locations of sensed points of the point cloud. Each coarse point is a geometrical element and is defined from one sample index s associated with a sensing time instant along the sensing path and one sensor index A associated with a sensor.

Figure 12:
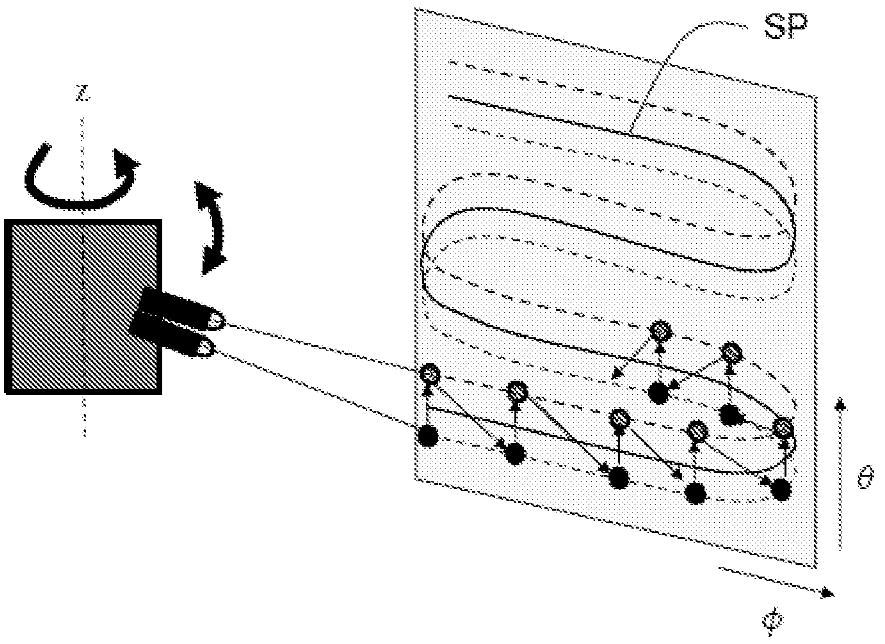
FIG. 12 shows schematically an example of an ordering of coarse points in accordance with an embodiment.

On the illustrative example of FIG. 12, a sensor head comprising two sensors is used. The sensing paths followed by the two sensors are represented in dash lines. For each sample index s (each sensing time instant), two coarse points are defined. The coarse points associated with the first sensor are represented by black shaded points on FIG. 12 and the coarse points associated with the second sensor are represented by a black hashed point.

Figure 13:
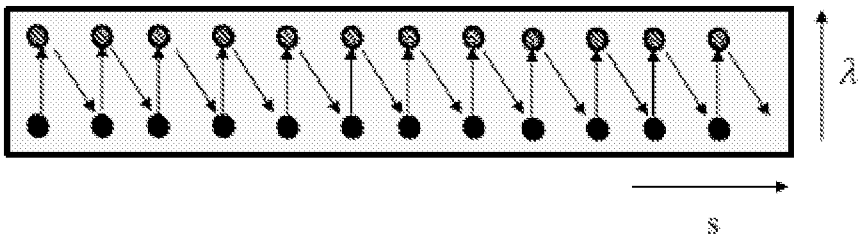
FIG. 13 shows schematically a representation of ordered points in a two-dimensional coordinate (s,λ) space in accordance with an embodiment.

Each of these two coarse points belongs to a sensor sensing path (dash line) defined from the sensing path SP. FIG. 13 illustrates a representation of ordered coarse points in the two-dimensional coordinate (s,λ) space. Arrows on FIGS. 12 and 13 illustrate the links between two successive ordered coarse points.

An order index o(P) is associated with each coarse point according to the rank of said coarse point among the ordered coarse points:

$$o(P) = \lambda + s * K$$

where K is the number of sensors of a set of sensors or the number of different positions of a single sensor for a same sample index, λ is the sensor index of the sensor that sensed the point P of the point cloud at the sensing time instant s.

Figure 14:
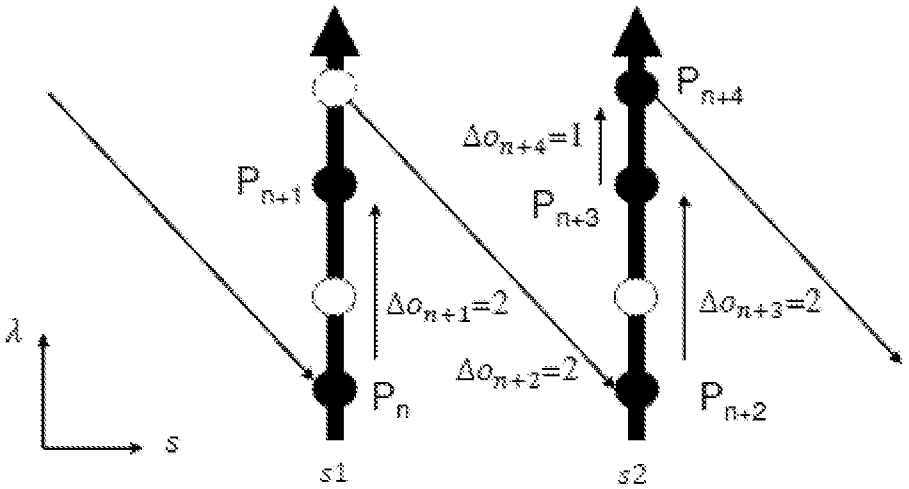
FIG. 14 shows schematically calculating of order index differences in accordance with an embodiment.

On FIG. 14, five occupied coarse points are represented (black circles): two coarse points ($P_n$ and $P_{n+1}$) are occupied by two points of the point cloud sensed at a sensing time instant $t_1$ (corresponding to a sample index $s_1$) and three coarse points ($P_n$, $P_{n+1}$ and $P_{n+2}$) are occupied by three points of the point cloud sensed at a sensing time instant $t_2$ (corresponding to a sample index $s_2$). Assuming the coordinates of the first occupied coarse point $P_n$ in the two-dimensional coordinate (s,λ) space are known beforehand, a first order index difference $\Delta o_{n+1}$ is obtained as a difference between the order index $o(P_{n+1})$ of the occupied coarse point $P_{n+1}$ and the order index $o(P_n)$ of the occupied coarse point $P_n$. In the example $\Delta o_{n+1}=2$ because a coarse point is not occupied (white circle). A second order index difference $\Delta o_{n+2}$ is obtained as a difference between the order index $o(P_{n+2})$ of another occupied coarse point $P_{n+2}$ and the order index $o(P_{n+1})$ of the occupied coarse point $P_{n+1}$, and so on.

Encoding point cloud geometry data comprises encoding the occupancies of the coarse points of the coarse representation by encoding order index differences Δo representing, each, a difference between order indices of two consecutive points $P_{-1}$ and P are obtained by:

$$\Delta o = o(P) - o(P_{-1})$$

The order index $o(P_1)$ of the first coarse point occupied by the first sensed point $P_1$ of the point cloud may be directly encoded into the bitstream B. This is equivalent to arbitrary setting the order index of a virtual zero-th point to zero, i.e. $o(P_0)=0$, and coding $\Delta o_1=o(P_1)-o(P_0)=o(P_1)$.

Given the order index $o(P_1)$ of the first coarse point occupied by the first sensed point $P_1$ of the point cloud, and order differences Δo, one can recursively reconstruct the order index o(P) of any coarse point occupied by a sensed point P of the point cloud by:

$$o(P) = o(P_{-1}) + \Delta o$$

Order index difference $\Delta o_n=o(P_n)-o(P_{n-1})$ are binarized and the obtained binary data $f_j$ are context-adaptive entropy encoded as above discussed.

Figure 15:
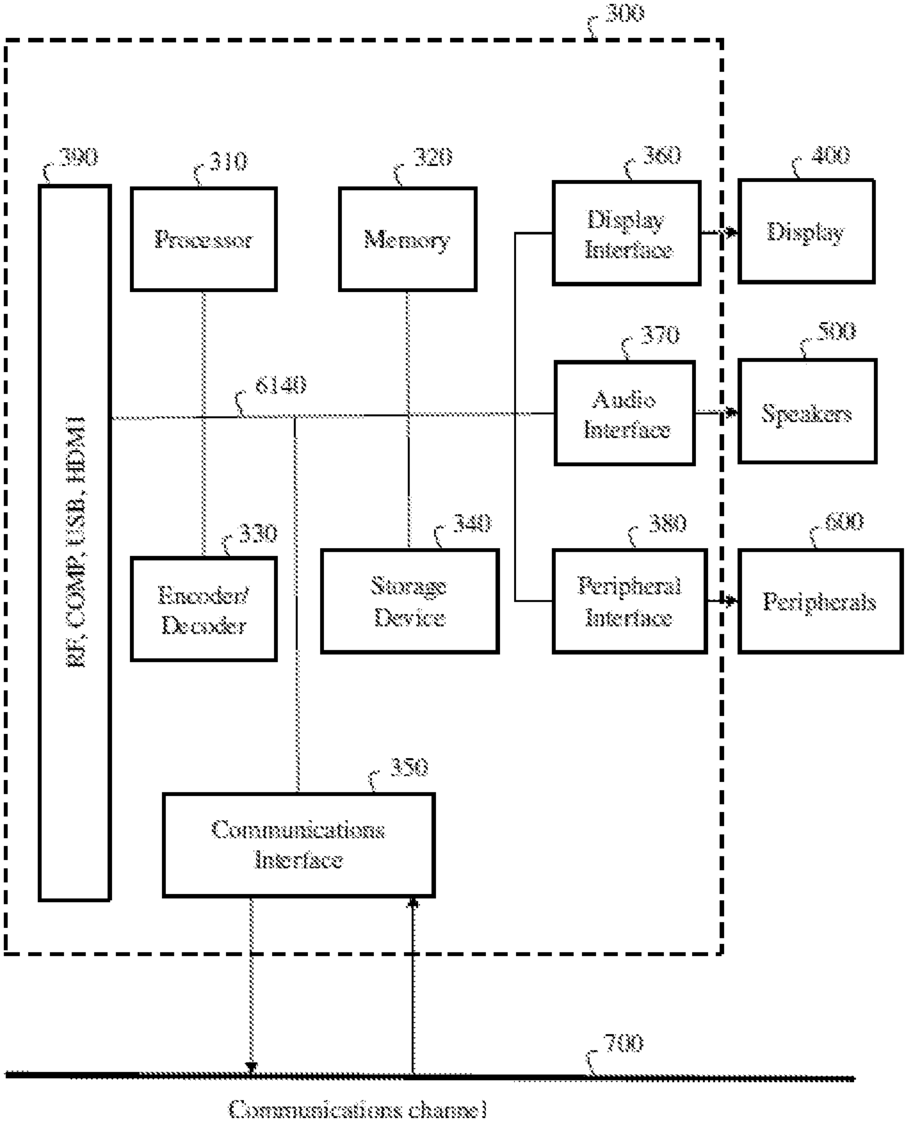
FIG. 15 shows a schematic block diagram of an example of a system in which various aspects and embodiments are implemented.

FIG. 15 shows a schematic block diagram illustrating an example of a system in which various aspects and embodiments are implemented.

System 300 may be embedded as one or more devices including the various components described below. In various embodiments, the system 300 may be configured to implement one or more of the aspects described in the present application.

Examples of equipment that may form all or part of the system 300 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), “caves” (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 300, singly or in combination, may be embodied in a single integrated circuit (IC), multiple ICs, and/or discrete components. For example, in at least one embodiment, the processing and encoder/decoder elements of system 300 may be distributed across multiple ICs and/or discrete components. In various embodiments, the system 300 may be communicatively coupled to other similar systems, or to other electronic devices, via, for example, a communications bus or through dedicated input and/or output ports.

The system 300 may include at least one processor 310 configured to execute instructions loaded therein for implementing, for example, the various aspects described in the present application. Processor 310 may include embedded memory, input output interface, and various other circuitries as known in the art. The system 300 may include at least one memory 320 (for example a volatile memory device and/or a non-volatile memory device). System 300 may include a storage device 340, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 340 may include an internal storage device, an attached storage device, and/or a network accessible storage device, as non-limiting examples.

The system 300 may include an encoder/decoder module 330 configured, for example, to process data to provide encoded/decoded point cloud geometry data, and the encoder/decoder module 330 may include its own processor and memory. The encoder/decoder module 330 may represent module(s) that may be included in a device to perform the encoding and/or decoding functions. As is known, a device may include one or both encoding and decoding modules. Additionally, encoder/decoder module 330 may be implemented as a separate element of system 300 or may be incorporated within processor 310 as a combination of hardware and software as known to those skilled in the art.

Program code to be loaded onto processor 310 or encoder/decoder 330 to perform the various aspects described in the present application may be stored in storage device 340 and subsequently loaded onto memory 320 for execution by processor 310. In accordance with various embodiments, one or more of processor 310, memory 320, storage device 340, and encoder/decoder module 330 may store one or more of various items during the performance of the processes described in the present application. Such stored items may include, but are not limited to, a point cloud frame, encoded/decoded geometry/attributes videos/images or portions of the encoded/decoded geometry/attribute video/images, a bitstream, matrices, variables, and intermediate or final results from the processing of equations, formulas, operations, and operational logic.

In several embodiments, memory inside of the processor 310 and/or the encoder/decoder module 330 may be used to store instructions and to provide working memory for processing that may be performed during encoding or decoding.

In other embodiments, however, a memory external to the processing device (for example, the processing device may be either the processor 310 or the encoder/decoder module 330) may be used for one or more of these functions. The external memory may be the memory 320 and/or the storage device 340, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), VVC (Versatile Video Coding), or MPEG-I part 5 (V-PCC) or part 9 (G-PCC).

The input to the elements of system 300 may be provided through various input devices as indicated in block 390. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 390 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 300 to other electronic devices across USB and/or HDMI connections. It is to be understood that various aspects of input processing, for example, Reed-Solomon error correction, may be implemented, for example, within a separate input processing IC or within processor 310 as necessary. Similarly, aspects of USB or HDMI interface processing may be implemented within separate interface ICs or within processor 310 as necessary. The demodulated, error corrected, and demultiplexed stream may be provided to various processing elements, including, for example, processor 310, and encoder/decoder 330 operating in combination with the memory and storage elements to process the data stream as necessary for presentation on an output device.

Various elements of system 300 may be provided within an integrated housing. Within the integrated housing, the various elements may be interconnected and transmit data therebetween using suitable connection arrangement 390, for example, an internal bus as known in the art, including the I2C bus, wiring, and printed circuit boards.

The system 300 may include communication interface 350 that enables communication with other devices via communication channel 700. The communication interface 350 may include, but is not limited to, a transceiver configured to transmit and to receive data over communication channel 700. The communication interface 350 may include, but is not limited to, a modem or network card and the communication channel 700 may be implemented, for example, within a wired and/or a wireless medium.

Data may be streamed to the system 300, in various embodiments, using a Wi-Fi network such as IEEE 802.11. The Wi-Fi signal of these embodiments may be received over the communications channel 700 and the communications interface 350 which are adapted for Wi-Fi communications. The communications channel 700 of these embodiments may be typically connected to an access point or router that provides access to outside networks including the Internet for allowing streaming applications and other over-the-top communications.

Other embodiments may provide streamed data to the system 300 using a set-top box that delivers the data over the HDMI connection of the input block 390.

Still other embodiments may provide streamed data to the system 300 using the RF connection of the input block 390.

The streamed data may be used as a way for signaling information used by the system 300. The signaling information may comprise the bitstream B and/or information such a number of points of a point cloud, coordinates and/or sensor setup parameters.

It is to be appreciated that signaling may be accomplished in a variety of ways. For example, one or more syntax elements, flags, and so forth may be used to signal information to a corresponding decoder in various embodiments.

The system 300 may provide an output signal to various output devices, including a display 400, speakers 500, and other peripheral devices 600. The other peripheral devices 600 may include, in various examples of embodiments, one or more of a stand-alone DVR, a disk player, a stereo system, a lighting system, and other devices that provide a function based on the output of the system 300.

In various embodiments, control signals may be communicated between the system 300 and the display 400, speakers 500, or other peripheral devices 600 using signaling such as AV.Link (Audio/Video Link), CEC (Consumer Electronics Control), or other communications protocols that enable device-to-device control with or without user intervention.

The output devices may be communicatively coupled to system 300 via dedicated connections through respective interfaces 360, 370, and 380.

Alternatively, the output devices may be connected to system 300 using the communications channel 700 via the communications interface 350. The display 400 and speakers 500 may be integrated in a single unit with the other components of system 300 in an electronic device such as, for example, a television.

In various embodiments, the display interface 360 may include a display driver, such as, for example, a timing controller (T Con) chip.

The display 400 and speaker 500 may alternatively be separate from one or more of the other components, for example, if the RF portion of input 390 is part of a separate set-top box. In various embodiments in which the display 400 and speakers 500 may be external components, the output signal may be provided via dedicated output connections, including, for example, HDMI ports, USB ports, or COMP outputs.

In FIG. 1-15, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 310 or by hardware, or by a combination of hardware and software. As a non-limiting example, the embodiments may be also implemented by one or more integrated circuits. The memory 320 may be of any type appropriate to the technical environment and may be implemented using any appropriate data storage technology, such as optical memory devices, magnetic memory devices, semiconductor-based memory devices, fixed memory, and removable memory, as non-limiting examples. The processor 310 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one embodiment" or "an embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one embodiment" or "in an embodiment" or "in one implementation" or "in an implementation", as well any other variations, appearing in various places throughout this application are not necessarily all referring to the same embodiment.

Similarly, reference herein to "in accordance with an embodiment/example/implementation" or "in an embodiment/example/implementation", as well as other variations thereof, is frequently used to convey that a particular feature, structure, or characteristic (described in connection with the embodiment/example/implementation) may be included in at least one embodiment/example/implementation. Thus, the appearances of the expression "in accordance with an embodiment/example/implementation" or "in an embodiment/example/implementation" in various places in the specification are not necessarily all referring to the same embodiment/example/implementation, nor are separate or alternative embodiment/examples/implementation necessarily mutually exclusive of other embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure. is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by a decoder. In various embodiments, such processes also, or alternatively, include processes performed by a decoder of various implementations described in this application, for example, As further examples, in one embodiment "decoding" may refer only to de-quantizing, in one embodiment "decoding" may refer to entropy decoding, in another embodiment "decoding" may refer only to differential decoding, and in another embodiment "decoding" may refer to combinations of de-quantizing, entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an encoder. In various embodiments, such processes also, or alternatively, include processes performed by an encoder of various implementations described in this application.

As further examples, in one embodiment "encoding" may refer only to quantizing, in one embodiment "encoding" may refer only to entropy encoding, in another embodiment "encoding" may refer only to differential encoding, and in another embodiment "encoding" may refer to combinations of quantizing, differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, this application may refer to "obtaining" various pieces of information. Obtaining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. For example, in certain embodiments the encoder signals a particular information such a number of points of the point cloud or coordinates or sensor setup parameters. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding, into a bitstream, point cloud geometry data represented by nodes of an occupancy tree occupying some positions of three-dimensional space, wherein an occupancy bitmap of a current node of the occupancy tree comprises occupancy data for child nodes of the current node, the method comprising:

obtaining a series of binary data ($f_{j,n}$) representative of occupancy data of already coded neighboring nodes belonging to a causal neighborhood of the current node;

obtaining a first index (I1) from the series of binary data ($f_{j,n}$), wherein the first index (I1) is a word formed by concatenating the binary data (fin) in a predetermined order and is representative of a neighborhood occupancy configuration among a first set of neighborhood occupancy configuration indices;

obtaining a second index (I2) by applying an index range reduction function (F) to the first index (I1), wherein the second index (I2) is representative of the neighborhood occupancy configuration among a second set of neighborhood occupancy configuration indices, and a range of the second set is lower than a range of the first set; and entropy encoding, into the bitstream, the binary data ($f_j$) representative of the occupancy data of the one child node of the current node using a context or probability selected based on at least the second index (I2).

2. The method of claim 1, wherein the binary data ($f_j$) is encoded by a binary arithmetic coder using an internal probability based on at least the second index.

3. The method of claim 2, wherein encoding the binary data ($f_j$) comprises selecting a context among a set of contexts based on at least the second index.

4. The method of claim 3, wherein selecting the context further depends on predictors of the binary data ($f_j$).

5. The method of claim 3, wherein encoding the binary data ($f_j$) comprises:

obtaining a context index (CtxIdx) as an entry of a context index table determined from at least the second index (I2);

obtaining a context (Ctx) associated with a probability ($p_{ctxIdx}$) as the entry, associated with the context index, of a context table comprising the set of contexts;

entropy encoding into the bitstream, the binary data ($f_j$) using the probability ($p_{ctxIdx}$); and updating the entry of the context index table based on the encoded binary data ($f_j$) to a new value.

6. A non-transitory computer-readable storage medium carrying instructions of program code for executing the method of claim 1.

7. The method of claim 1, wherein the occupancy bitmap comprises eight binary data respectively associated with eight child nodes of the current node.

8. A method of decoding, from a bitstream, point cloud geometry data represented by nodes of an occupancy occupying some positions of a three-dimensional space, wherein an occupancy bitmap of a current node of the occupancy tree comprises occupancy data for child nodes of the current node, the method comprising:

obtaining, a series of binary data ($f_{j,n}$) based on occupancy data of precedingly decoded nodes belonging to a causal neighborhood of the current node;

obtaining a first index (I1) from the series of binary data ($f_{j,n}$), wherein the first index (I1) is a word formed by concatenating the binary data (fin) in a predetermined order and is representative of a neighborhood occupancy configuration among a first set of neighborhood occupancy configuration indices;

obtaining a second index (I2) by applying an index range reduction function (F) to the first index (I1);

wherein the second index (I2) is representative of the neighborhood occupancy configuration among a second set of neighborhood occupancy configuration indices, and a range of the second set is lower than a range of the first set; and entropy decoding, from the bitstream, the binary data ($f_j$) representative of the occupancy data of the one child node of the current node using a context or probability selected based on at least the second index (I2).

9. An apparatus of decoding, from a bitstream, point cloud geometry data represented by nodes of an occupancy tree occupying some discrete positions of a three-dimensional space, wherein an occupancy bitmap of a current node of the occupancy tree comprises occupancy data for child nodes of the current node, and the apparatus comprises at least one processor configured to perform the method of claim 8.

10. A non-transitory computer-readable storage medium carrying instructions of program code for executing the method of claim 8.

11. The method of claim 8, wherein the binary data ($f_j$) is decoded by a binary arithmetic decoder using an internal probability based on at least the second index.

12. The method of claim 11, wherein decoding the binary data ($f_j$) comprises selecting a context among a set of contexts based on at least the second index.

13. The method of claim 12, wherein selecting the context further depends on predictors of the binary data ($f_j$).

14. The method of claim 12, wherein decoding the binary data ($f_j$) comprises:

obtaining a context index (CtxIdx) as an entry of a context index table determined from at least the second index (I2);

obtaining a context (Ctx) associated with a probability ($p_{ctxIdx}$) as the entry, associated with the context index, of a context table comprising the set of contexts;

entropy decoding from the bitstream, the binary data ($f_j$) using the probability ($p_{ctxIdx}$); and updating the entry of the context index table based on the decoded binary data ($f_j$) to a new value.

15. The method of claim 8, wherein the occupancy bitmap comprises eight binary data respectively associated with eight child nodes of the current node.

16. An apparatus of encoding, into a bitstream, point cloud geometry data represented by nodes of an occupancy tree occupying some discrete positions of a three-dimensional space, wherein an occupancy bitmap of a current node of the occupancy tree comprises occupancy data for child nodes of the current node, and the apparatus comprises at least one processor configured to:

obtaining a binary data ($f_j$) representative of an occupancy data of one of the child nodes of the current node;

obtaining a series of binary data ($f_{j,n}$) representative of occupancy data of already coded neighboring nodes belonging to a causal neighborhood of a current node;

obtaining a first index (I1) from the series of binary data ($f_{j,n}$), wherein the first index (I1) is a word formed by concatenating the binary data ($f_{j,n}$) in a predetermined order and is being representative of a neighborhood occupancy configuration among a first set of neighborhood occupancy configuration indices;

obtaining a second index (I2) by applying an index range reduction function (F) to the first index (I1);

wherein the second index (I2) is representative of the neighborhood occupancy configuration among a second set of neighborhood occupancy configuration indices, and a range of the second set is lower than a range of the first set; and entropy encoding, into the bitstream, at least one binary data ($f_j$) representative of the occupancy data of the one child node of the current node using a context or probability selected based on at least the second index (I2).

* * * * *